United States Patent
Marone

(10) Patent No.: US 11,709,103 B2
(45) Date of Patent: Jul. 25, 2023

(54) TEMPERATURE SENSOR AND METHOD OF MANUFACTURE

(71) Applicant: PRATT & WHITNEY CANADA CORP., Longueuil (CA)

(72) Inventor: Joseph Marone, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 451 days.

(21) Appl. No.: 16/878,792

(22) Filed: May 20, 2020

(65) Prior Publication Data

US 2021/0364366 A1 Nov. 25, 2021

(51) Int. Cl.
*G01K 7/02* (2021.01)
*G01K 7/16* (2006.01)
*H01C 1/028* (2006.01)
*H01C 3/00* (2006.01)

(52) U.S. Cl.
CPC ............... *G01K 7/021* (2013.01); *G01K 7/16* (2013.01); *H01C 1/028* (2013.01); *H01C 3/00* (2013.01); *Y10T 29/49002* (2015.01); *Y10T 29/49082* (2015.01); *Y10T 29/49085* (2015.01)

(58) Field of Classification Search
CPC .......... H01C 1/028; H01C 3/00; G01K 7/021; G01K 7/16; Y10T 29/49002
See application file for complete search history.

(56) References Cited

U.S. PATENT DOCUMENTS

| | | | | |
|---|---|---|---|---|
| 3,761,857 A * | 9/1973 | Carlson | ..................... | H01C 3/00 338/331 |
| 3,798,760 A * | 3/1974 | Carlson | ................. | H01C 1/1406 29/618 |
| 3,939,557 A * | 2/1976 | Rendle | .................... | G01K 7/183 338/264 |
| 3,960,604 A * | 6/1976 | Heitzinger | ................ | G01K 1/08 136/201 |
| 4,934,831 A * | 6/1990 | Volbrecht | .................. | G01K 1/08 374/163 |
| 5,119,036 A | 6/1992 | Rickards et al. | | |
| 7,004,626 B1 * | 2/2006 | Giberson | ................ | G01K 13/02 374/E7.004 |
| 9,103,731 B2 * | 8/2015 | DeFrietas | ................. | G01K 1/12 |
| 9,596,795 B2 * | 3/2017 | Pfau | ........................ | G01F 1/684 |
| 9,778,145 B2 | 10/2017 | Walling | | |
| 10,132,667 B2 * | 11/2018 | Gras | ........................ | G01K 13/02 |
| 2017/0343423 A1 * | 11/2017 | Krzywosz | ............... | H01C 1/028 |

* cited by examiner

*Primary Examiner* — Kyung S Lee
(74) *Attorney, Agent, or Firm* — Norton Rose Fulbright Canada LLP

(57) ABSTRACT

The temperature sensor can have a core having a length extending between two ends, the core having a cavity extending along the length, a wire extending in the cavity, along the length, the wire fixed at both ends, the core having a transversal aperture at an intermediary location between the ends, the transversal aperture leading into the cavity, and a potting filling a portion of the cavity and supporting the wire at the intermediary location of the transversal aperture.

19 Claims, 3 Drawing Sheets

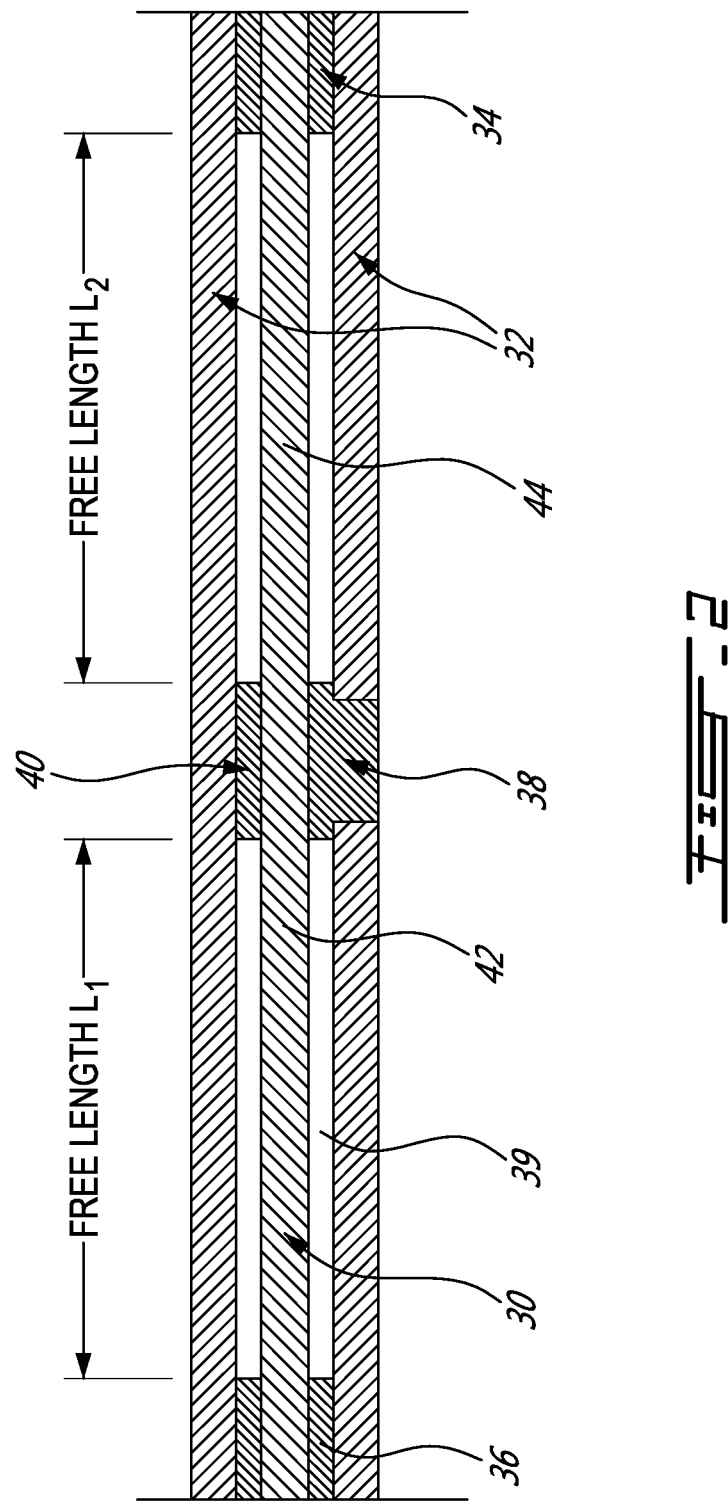

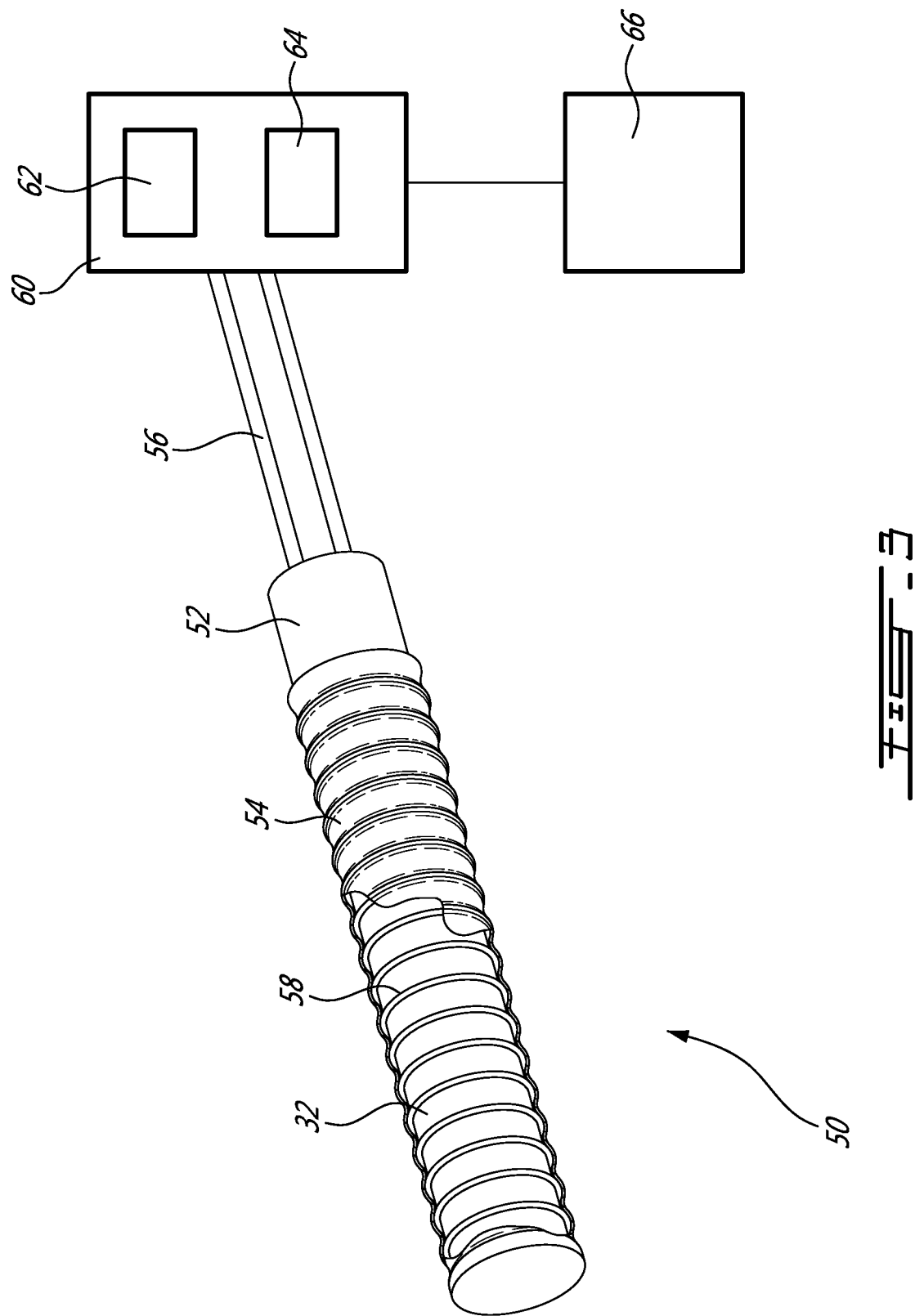

TEMPERATURE SENSOR AND METHOD OF MANUFACTURE

TECHNICAL FIELD

The application relates generally to gas turbine engines and, more particularly to a temperature sensor which can be used in a gas turbine engine.

BACKGROUND OF THE ART

It is common to use temperature sensors for various purposes in gas turbine engines. One commonly used type of temperature sensor is the resistance temperature detector (RTD), which is based on the principle that the resistance of a metal varies depending on the temperature. In practice, RTDs typically circulate electrical current along a length of wire which is typically fine and fragile, and monitor the response of the wire to the current circulation. The amount of current circulated at a constant difference of potential, or the amount of difference of potential stemming from a fixed current, will vary in accordance with resistance based on the relationship V=RI. Platinum is an interesting material for use in the wire, because its resistance vs. temperature relationship is constant over a large range of temperature, but other metals, such as nickel and copper, have been used as well.

While existing temperature sensors are satisfactory to a certain degree, there always remains room for improvement. In particular, there was a desire to improve the reliability and/or its useful life expectancy while controlling cost and weight, for instance.

SUMMARY

In one aspect, there is provided a temperature sensor comprising a core having a length extending between two ends, the core having a cavity extending along the length, a wire extending in the cavity, along the length, the wire fixed at both ends, the core having a transversal aperture at an intermediary location between the ends, the transversal aperture leading into the cavity, and a potting filling a portion of the cavity and supporting the wire at the intermediary location of the transversal aperture.

In another aspect, there is provided a method of making a temperature sensor, the method comprising introducing potting material, in malleable form, into a gap between a wire and an inner wall of a core, via a transversal aperture in the core; solidifying the potting material for the potting material to hold a portion of the wire relative to the core thereafter, thereby impeding resonance of the wire at lower frequencies than the natural frequencies of any remaining unsupported portions of the wire.

In a further aspect, there is provided a gas turbine engine comprising a temperature sensor, the temperature sensor comprising a core having a length extending between two ends, the core having a cavity extending along the length, a wire extending in the cavity, along the length, the wire fixed at both ends, the core having a transversal aperture at an intermediary location between the ends, the transversal aperture leading into the cavity, and a potting filling a portion of the cavity and supporting the wire at the intermediary location of the transversal aperture.

DESCRIPTION OF THE DRAWINGS

Reference is now made to the accompanying figures in which:

FIG. 2 is a cross sectional view of a core of a temperature sensor, taken along a longitudinal plane.

FIG. 3 is an oblique view of a temperature sensor incorporating the core of FIG. 2.

DETAILED DESCRIPTION

Figure 1:
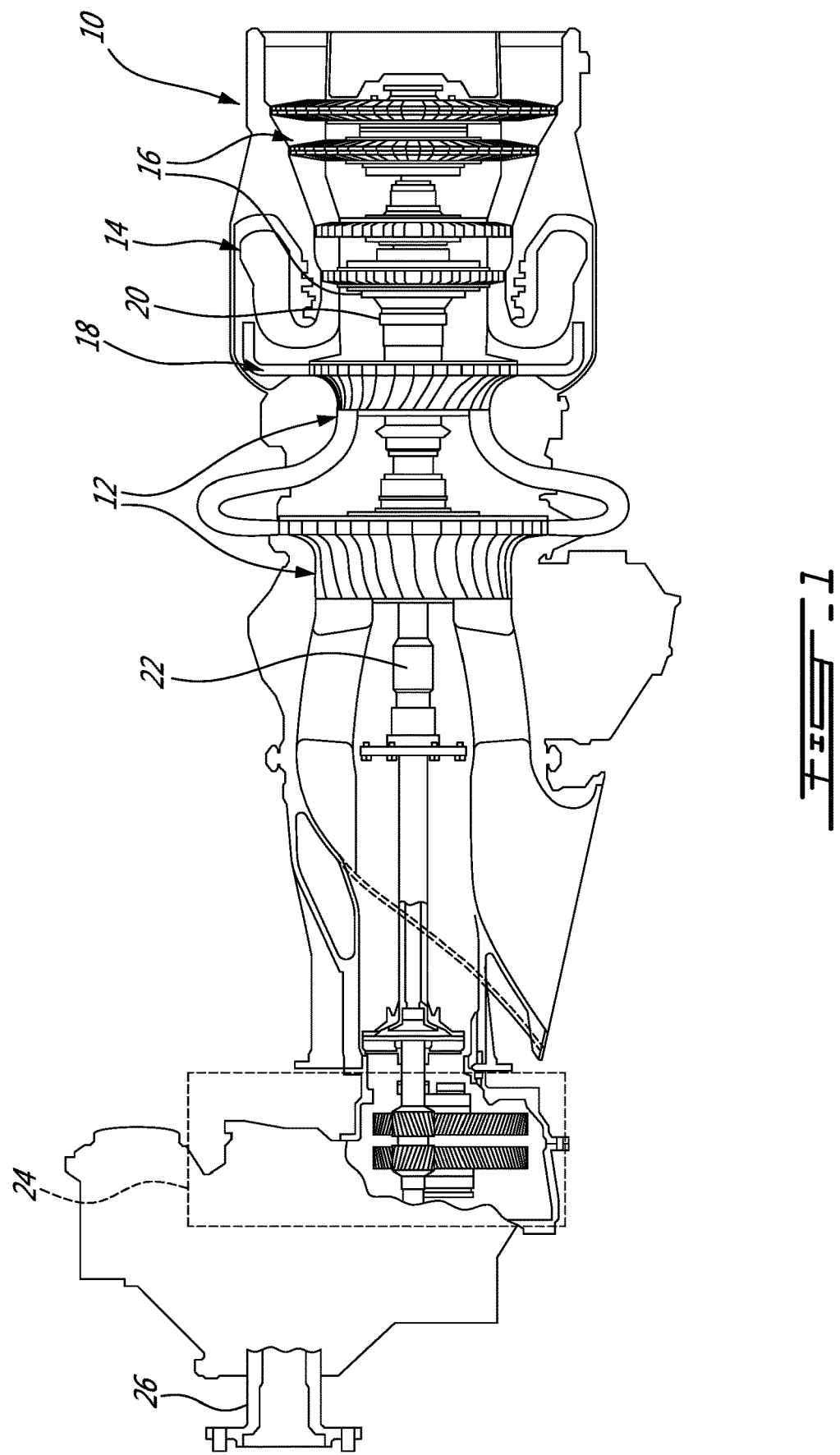
FIG. 1 is a schematic cross-sectional view of a gas turbine engine.

FIG. 1 illustrates an example of a turbine engine. In this example, the turbine engine 10 is a turboprop engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. In the embodiment shown in FIG. 1, the turboshaft engine 10 has two compressor and turbine stages, including a high pressure stage associated to a high pressure shaft 20, and a low pressure stage associated to a low pressure shaft 22. The low pressure shaft 22 is used as a power source during use.

Turboprop engines, similarly to turboshaft engines, typically have some form of gearing by which the power of the low pressure shaft 22 is transferred to an external shaft 26 bearing blades or propeller. This gearing, which can be referred to as a gearbox 24 for the sake of simplicity, typically reduces the rotation speed to reach an external rotation speed which is better adapted to rotate the blades or propeller for instance. Due to the presence of blades or propeller and/or gearing, turboprop and turboshaft engines typically generate more vibration than turbofan engines during normal operation.

Temperature sensors can be used at various locations on a gas turbine engine and for various reasons. Some temperature sensors, such as some resistance temperature detectors of the wire-wound element type, for instance, have a core in which an unsupported length of a wire extends. Failure of some of such sensors has been attributed to rupture of the unsupported length of the wire due to vibrations. This was surprising because the impact of vibrations on a turbine engines are typically assessed in the design phase. High frequencies at low energy levels are typically ignored on the basis that they do not have a significant impact on the operation of the engine. It is thus counterintuitive to think that sources of low energy, high frequency vibrations could lead to breaking of the wire, given their energy levels. However, it appeared that even at relatively low energy levels, if the frequency of the vibrations corresponded to the natural resonance frequency of the unsupported length of the wire, resonance could occur within the wire and lead to failure.

It was theorized that failure could occur due to harmonic excitation at frequencies that were relatively high, e.g. above 2000 Hz, perhaps around 2500 Hz in some embodiments, and which were typically not monitored given their relatively low energy. It appeared to plausible, given the size and strength of this wire, that even low energy vibes could excite and break the wire. A solution was proposed in the form of changing the resonant frequency of the wire to avoid the problematic frequencies.

The natural frequency of a wire can be changed by changing its length. More specifically, the natural frequency of a fixed beam with uniform load w per unit length including beam weight is as follows:

$$fn = \frac{Kn}{2\pi}\sqrt{\frac{EIg}{wL^4}} \quad (1)$$

where Kn=Constant for mode of vibration for configuration; I=Moment of inertia; L=Length of wire; E=Modulus of elasticity and W=uniform load. Accordingly, the length of the wire L directly drives the natural excitation frequency of the wire. Reducing this length will increase the frequency.

The effective length of the wire, and thus its frequency, could be changed by providing an additional support to the wire, at an intermediary location between the ends of the core, where the wire was already fixed.

Referring to FIG. 2, in one embodiment, the wire 30 can be held within the core 32 at both ends by respective pottings 34, 36. An additional hole, in the form of a transversal aperture 38, can provided at an intermediary location (e.g. mid-span) of the core 32, through which an additional potting 40 can be introduced into the cavity 39, around the wire 30, to support the wire 30 and prevent it from moving relative to the core 32 at that location. This can leave two unsupported segments 42, 44 of the wire 30, both having less than half the length of what the unsupported length would be without the additional potting. Accordingly, the natural frequency of the remaining unsupported portions 42, 44 of the wire 30 can be more than doubled due to the presence of the intermediary location potting 40. Even further increase in the unsupported length natural resonance frequencies can be achieved by adding more pottings, at multiple intermediary locations. Increasing the frequency of the wire can allow to increase the reliability of the wire by preventing its natural frequency to coincide with potentially problematic engine vibration frequencies. It will be understood that in the final product, the intermediary potting(s) 40 will likely be exposed via the corresponding transversal apertures 38, and may partially or entirely fill the transversal aperture 38.

One alternative avenue to an embodiment where the wire 30 is held by pottings 34, 36 at both ends of the core 32 would be to extend the potting (e.g. 34), introduced at one end, along the entire length of the cavity 39 or gap. However, in practice, this is not feasible in many embodiments. For instance, in one embodiment, the wire 30 has a diameter of 0.010", whereas the cavity 39 has a diameter of 0.015". A gap of roughly 0.0025" is left between the wire 30 and the core 32 on all sides. Such a gap can be so small, depending also on the potting material, so as to prevent the potting material from penetrating beyond a certain distance. Such small dimensions can prevent the capillary effect from allowing the potting material in liquid phase to become absorbed along the entire length of the wire, for instance. Different embodiments can have different wire diameters and different internal core sizes, but it may not be feasible to introduce potting along the full length of the core, from the end, in embodiments where the diameter of the cavity is less than three times the diameter of the wire, for instance. Forming one or more transversal (radial) apertures 38 in the core can allow to overcome this limitation, and allow potting to reach one or more intermediary location along the wire 30. In one embodiment, one or more transversal apertures 38 can be formed to introduce potting in a manner to fill the gap between the wire 30 and the core's inner wall along the entire length of the core 32, leaving no length of the wire unsupported, but this approach may be more costly and not required for many embodiments.

FIG. 3 illustrates an example temperature sensor 50 of the resistance temperature detector type, having a sensing element of the wire wound type, and will be used to explain an example possible use of the technique. In this example, a base 52 is provided in a manner to securely receive both a core 32 and a shell 54. Both the core 32 and the shell 54 are straight hollow tubes connected to the base 52 at a proximal end. The core 32 is made of an electrically insulating material. Two electrical leads 56 penetrate into the base. At least one wire 30 extends in the cavity 39, along the entire length of the core 32 and connects to one of the leads 56 at the proximal end. A sensing coil 58 is wrapped around the core 32. The sensing coil 58 can be made of a very thin metal wire, such as a platinum wire having 0.001" in diameter, for instance. The sensing coil is connected to the wire 30 at the distal end, and the wire 30 inside the core 32 thus connects the distal end of the sensing coil 58 to the first electrical lead 56. The proximal end of the sensing coil 58 is connected to the second one of the electrical leads 56. In some embodiments, the proximal end of the sensing coil 58 can be connected to the second electrical lead 56 via a second wire which extends from the base 52, along a minor portion of the cavity 39 in the core 32. Care is taken in all electrical connections and contacts to avoid introducing noise or otherwise reducing the sensitivity of the sensor, different materials can be used to make the different segments of the electrical path, but usual care may need to be taken to avoid undesired phenomena such as corrosion.

The shell 54 covers the sensing coil 58, which is typically very fragile given the diameter of its wire, and protects it. The shell 54 is typically made of a metal having a very high thermal conductivity coefficient to allow the sensing coil 58 to be as sensitive as feasible to the temperature of its environment.

An interrogation system 60 can be provided in connection with the leads 56, including an electrical energy source 62 configured to induce current circulation along the electrical path/circuit, including the sensing coil 58, and a meter 64 configured to measure a response of the gap to the induced current circulation. One form or another of computer 66 or controller can be used to associated the measured response (typically associated to a resistance value of the sensing coil 58), to a temperature, on the basis of the temperature-resistance relationship of the material of the sensing coil as stored in reference data.

In this example, the core 32 can be a cylindrical tube of electrically insulating material such as presented in FIG. 2. The wire 30 can be fixed at both ends by pottings 34, 36 introduced into the gaps present between the wire 30 and the tube at the corresponding ends. The pottings 34, 36 can be introduced using usual processes, which typically involve introducing a material in liquid or viscous/gelatinous form into the desired area, and solidifying that material. Various potting techniques and potting materials exist, and the resulting hardness can vary, but the resulting hardness is typically significantly greater after solidification. In the specific example of FIG. 2, the core 32 has a transversal aperture 38 at mid-length, which leads from outside the core 32 into the cavity 39. Potting material can be introduced via the transversal aperture 38 to fill a portion of the gap between the wire 30 and the core 32, and thence be solidified so as to firmly support the wire at that intermediary location thereafter. In this example, the potting material cannot penetrate along the entire length of the cavity, necessitating the transversal aperture to provide the intermediary location support. Nonetheless, the presence of the intermediary potting 40 leaves two unsupported lengths of wire 42, 44, each one being between the center potting 40 and a corresponding end potting 36, 34, and the length of each one of these wire portions 42, 44 is smaller than half the length of the wire 30 between the two end pottings 34, 36. Accordingly, the natural resonance frequency of each one of these two unsupported wire portions 42, 44 is more than twice the value of the natural resonance frequency the wire 30 would have if it was not supported at the intermediary location.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, a temperature sensor such as described herein can be used in a turbofan engine instead of a turboshaft or turboprop, and may also be used in other engine types or other applications. In a specific example presented above, the wire had a diameter of 0.010". It will be understood that different diameters of wires may be used in different application and such diameters may be within a range of between 0.005" and 0.020", or outside the latter range. In a specific embodiment presented above, the core was cylindrical, and the cavity had a diameter of 0.015". Cavities can have different dimensions in alternate embodiments, and can be less than 5 times the diameter of the wire, less than three times the diameter of the wire, less than two times the diameter of the wire, to name a few examples. In alternate embodiments, the core can have a shape other than cylindrical, such as rectangular. Moreover, rather than being straight, the core may be curved or otherwise have a more complex shape in alternate embodiments. The way the wire is held at both ends, and electrically connected to other elements of the circuit, can vary in alternate embodiments. Moreover, the techniques presented above and illustrated may be useful in reducing the natural resonance frequency of a wire held in a core in applications other than a temperature sensor. Multiple pottings can be introduced to support the wire at multiple locations between the ends of the wire. Yet further modifications could be implemented by a person of ordinary skill in the art in view of the present disclosure, which modifications would be within the scope of the present technology.

The invention claimed is:

1. A temperature sensor comprising a core having a length extending between a first end and a second end, the core having a cavity extending along the length, a wire extending in the cavity, along the length, the wire fixed at the first end and at the second end, the core having a transversal aperture at an intermediary location between the ends, the transversal aperture leading into the cavity, and a potting filling a portion of the cavity and supporting the wire at the intermediary location of the transversal aperture.

2. The temperature sensor of claim 1, further comprising at least two unsupported portions of the wire, each between the potting and a corresponding end, the length of each unsupported portion of the wire being smaller than a length of the wire between the two ends.

3. The temperature sensor of claim 1 further comprising at least two of said transversal apertures and pottings, the transversal apertures and pottings being interspaced along the length of the core and supporting the wire at respective intermediary locations between the ends.

4. The temperature sensor of claim 1 wherein the diameter of the wire is of between 0.005" and 0.020".

5. The temperature sensor of claim 4 wherein the core is cylindrical and the cavity has a diameter of less than 3 times the diameter of the wire.

6. The temperature sensor of claim 1 wherein the core is cylindrical and the cavity has a diameter of less than 3 times the diameter of the wire.

7. The temperature sensor of claim 1 wherein the core is made of an electrically insulating material.

8. The temperature sensor of claim 1 wherein the wire is fixed at both ends by corresponding pottings.

9. The temperature sensor of claim 1 wherein the wire is made of platinum.

10. The temperature sensor of claim 1 wherein a sensing coil is wrapped around the core, the sensing coil is made of a material having a diameter smaller than the diameter of the wire, the sensing coil being electrically connected to the wire at a distal one of the ends.

11. The temperature sensor of claim 10 further comprising a first electrical lead connected to the wire at a proximal one of the ends, and a second electrical lead connected to the sensing coil at the proximal end, a base supporting the coil, and a metal shell secured to the base and covering the core and the sensing coil, an electrical power source for inducing current circulation along the sensing coil via the leads, and a meter for measuring a response of the sensing coil to the induced current circulation.

12. A method of making a temperature sensor, the method comprising:
   introducing material into a gap between a wire of the sensor and an inner wall of a core of the sensor, via a transversal aperture in the core;
   said material holding a portion of the wire relative to the core thereafter; and
   wrapping a sensing coil around the core, and connecting one end of the sensing coil to a corresponding end of the wire.

13. The method of claim 12 wherein said material is potting material initially introduced in malleable form and subsequently solidified.

14. The method of claim 13 further comprising introducing said potting material, in malleable form, into the gap between the wire and the inner wall of the core, via the ends of the core, and solidifying the potting material introduced via the ends of the core.

15. The method of claim 14 wherein the step of introducing potting material via the transversal aperture is performed subsequently to the step of introducing potting material via the ends, and the holding of the wire relative to the core increases the natural frequency of unsupported portions of the wire compared to the natural frequency of the wire prior to introducing the potting material via the transversal aperture.

16. The method of claim 12 further comprising inducing current circulation along an electrical circuit including the wire, and measuring a response of the electrical circuit to the induced current circulation.

17. The method of claim 14 wherein said introducing potting material includes said potting material being prevented from penetrating further along the gap due to the size of the gap and the nature of the potting material, thereby leaving unsupported portions of the wire on both sides.

18. A gas turbine engine comprising a temperature sensor, the temperature sensor comprising a core having a length extending between two ends, the core having a cavity extending along the length, a wire extending in the cavity, along the length, the wire fixed at both ends, the core having a transversal aperture at an intermediary location between the ends, the transversal aperture leading into the cavity, and a potting filling a portion of the cavity and supporting the wire at the intermediary location of the transversal aperture.

19. The gas turbine engine of claim 18 wherein the gas turbine engine is a turboprop or turboshaft engine.

\* \* \* \* \*